United States Patent
Kumar et al.

(10) Patent No.: US 6,597,662 B1
(45) Date of Patent: Jul. 22, 2003

(54) APPARATUS AND METHOD FOR OPTIMIZING MAX-MIN FAIR RATE CONTROL IN ABR SESSIONS

(75) Inventors: Anurag Kumar, Bangalore (IN); Santosh P. Abraham, Bangalore (IN); Greg M. Bernstein, Fremont, CA (US); Jeffrey T. Gullicksen, Santa Clara, CA (US); Gurpreet S. Chhabra, Sunnyvale, CA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/076,844

(22) Filed: May 13, 1998

(30) Foreign Application Priority Data

Mar. 24, 1998 (IN) .......................................... 494CAL98

(51) Int. Cl.[7] .............................................. H04L 12/56
(52) U.S. Cl. .................................. 370/236; 370/395.43
(58) Field of Search .............................. 370/236, 468, 370/229–235, 241, 252, 254, 395.1, 351, 352, 389, 399, 395.41, 395.4, 395.43, 395.51, 395.21, 392, 535, 537, 428, 413–418; 340/825.5, 825.51, 825.01

(56) References Cited

U.S. PATENT DOCUMENTS

| | | | |
|---|---|---|---|
| 5,633,859 A | 5/1997 | Jain et al. | 370/234 |
| 5,633,861 A | 5/1997 | Hanson et al. | 370/232 |
| 5,812,527 A | 9/1998 | Kline et al. | 370/232 |
| 6,061,330 A | * 5/2000 | Johansson | 370/229 |
| 6,144,636 A | * 11/2000 | Aimoto et al. | 370/229 |

FOREIGN PATENT DOCUMENTS

| | | |
|---|---|---|
| EP | 0 796 027 A2 | 9/1997 |
| EP | 0 797 372 A2 | 9/1997 |
| GB | 2 301 985 A | 12/1996 |
| WO | WO 97/44724 | 11/1997 |
| WO | WO 98/43395 | 10/1998 |

OTHER PUBLICATIONS

Mosely, J., *Asynchronous Distributed Flow Control Algorithms*, Laboratory for Information and Decision Systems, Massachusetts Institute of Technology, LIDS–TH–1415, Oct. 1984.
Jain, R. et al., *The ERICA Switch Algorithm For ABR Traffic Management In ATM Networks, Part I: Description*, The Ohio State University, Department of CIS, submitted to the IEEE/ACM Transactions on Networking, Jan. 1987, 1–33.
Chang, Y. et al., *A Rate Based Flow Control Switch Design for ABR Service In An ATM Network*, National Institute of Standards and Technology.
Siu, K. and Tzeng, H., *Intelligent Congestion Control For ABR Service in ATM Networks*, ACM SIGCOMM Computer Communication Review, 81–105, 27.
Kolarov, A. and Ramamurthy, G., *A Control Theoretic Approach to the Design of Closed Loop Rate Based Flow Control for High Speed ATM Networks*, 0–8186–7780–5/97 IEEE (1997).

*Primary Examiner*—Dang Ton
(74) *Attorney, Agent, or Firm*—Finnegan, Henderson, Farabow, Garrett & Dunner, L.L.P.

(57) ABSTRACT

Fairness is provided among network sessions contending for available bit rate (ABR) service in an asynchronous transfer mode network by determining congestion information on a per port basis. ABR cells are monitored to determine which rate information per outgoing port based on ABR cells leaving a switch. Using the ABR per port rate, the available capacity, and the input rate to output queues, a link congestion parameter (LCP) is determined. Resource Management (RM) cells traveling through the switch are monitored to determine whether the new LCP is lower than the explicit rate (ER) field in RM cell. If the new LCP is lower, the new LCP is stuffed into the RM cell. When the sender receives the LCP value, the sender output rate is adjusted based on the LCP. Because LCP is determined based on per port traffic flow, fairness is provided among session competing for available ABR capacity.

41 Claims, 11 Drawing Sheets

OTHER PUBLICATIONS

Fulton, C. et al. *An ABR Feedback Control Scheme with Tracking*, 0–8186–7780–5/97 IEEE (1997).

Charny, A., et al. *Congestion Control with Explicit Rate Indication*, 0–7803–2486–2/95 IEEE, 1954–1963 (1995).

Awerbuch, B. and Shavitt, Y., *Converging to Approximated Max–Min Flow Fairness in Logarithmic Time*, 0–7803–4386–7/98 IEEE (1998).

Hou, Y. et al., *A Generalized Max–Min Network Capacity Assignment Policy With A Simple ABR Implementation For An ATM LAN*, 0–7803–4201–1/97 IEEE 1997.

Abraham, S., and Kumar, A., *Max–Min Fair Rate Control of ABR Connections with Nonzero MCRs*, Dept. of Electrical Communication Engg., Indian Institute of Science, Bangalore, India.

Abraham, S. and Kumar, A., *A Stochastic Approximation Approach For Max–Min Fair Adaptive Rate Control of ABR Sessions with MCRs*, Dept. of Electrical Communication Engg., Indian Institute of Science, Bangalore, India.

Abraham, S. and Kumar, A., *A Simulation Study Of Adaptive Distributed Algorithms For Max–Min Fair Rate Control of ABR Sessions With MCRs, CBR/VBR Traffic and Finite Link Buffers, in a Local Area Network*, Dept. of Electrical Communication Engg., Indian Institute of Science, Bangalore, India.

Abraham, S. and Kumar, A., *Asynchronous Distributed Algorithms for Max–Min Fair Allocation with Delayed Feedback Information*, Dept. of Electrical Communication Engg., Indian Institute of Science, Bangalore, India.

Abraham, S. and Kumar, A., *A Simulation Study of Stochastic Approximation Algorithms for Adaptive Rate Control of ABR Traffic*, Dept. of Electrical Communication Engg., Indian Institute of Science, Bangalore, India.

F. P. Kelly, A.K. Maulloo, and D. K. H. Tan "Rate control for communication networks: shadow prices, proportional fairness and stability," Journal of the Operational Research Society, vol. 49, No. 3, Mar. 1998, pp. 237–252.

* cited by examiner

APPARATUS AND METHOD FOR OPTIMIZING MAX-MIN FAIR RATE CONTROL IN ABR SESSIONS

I. BACKGROUND OF THE INVENTION

A. Field of the Invention

The present invention relates generally to digital networks, and in particular to apparatus and methods for optimizing max-min fair rate control in available bit rate (ABR) service in an asynchronous transfer mode (ATM) network.

B. Description of the Prior Art

FIG. 1 is a block diagram showing a prior art network architecture. Data is transferred between user 116 and user 118 according to a particular network protocol. The ATM protocol is commonly used for transferring data over a network. FIG. 1 shows a representative path over which data may travel when transferred from user 116 to user 118: over ATM network 110, switch 114, ATM network 120, switch 122, and ATM network 112.

In the ATM protocol, data is divided and placed into ATM cells. FIG. 2 is a block diagram showing the format of an ATM cell. The cell is comprised of the following fields: general flow control (GFC), virtual path identifier (VPI), virtual channel identifier (VCI), payload type identifier (PTI), cell loss priority (CLP), head error control (HEC), and the cell payload. The fields are well understood in the art, and will not be discussed in detail here.

Each cell carries a portion of the data being transferred. Even though the data is split into units, to each user the data appears to be transferred as a single unit. This is called a virtual circuit. A session is the period during which there is active communication between endpoints, such as user 116 and user 118, on the network.

At any time, one or more sessions may be transferring cells across the network. Each session has unique characteristics. For example, real time applications, such as video and voice, require data to be transferred between sender and destination in a timely manner. Other data is not as time sensitive, and can therefore be transferred with less concern for timeliness.

ATM Service Categories

The ATM protocol recognizes that each session has certain requirements, and not all sessions have the same requirements. Therefore, different service categories are supported, including constant bit rate (CBR), variable bit rate (VBR), available bit rate (ABR), and unspecified bit rate (UBR). Each service category is designed to address the requirements of different types of sessions.

CBR and VBR services guarantee certain performance levels when transferring data. In contrast, ABR service does not provide the same level of guarantees as CBR and VBR, but attempts to provide best effort data services by using the bandwidth left over by CBR and VBR. The bandwidth for ABR, therefore, depends on the network bandwidth used by ongoing CBR and VBR sessions. Rates of ABR sessions are adjusted in response to the varying available bandwidth. ABR service is best suited for carrying network traffic that is not sensitive to delay and can tolerate varying rates during a session.

ABR Rate-based Feedback

To adjust ABR sessions in response to changing CBR and VBR demands, a rate-based feedback system is used. Each switch and the destination monitors network flow and provides network rate feedback information to the sender using resource management (RM) cells.

FIG. 3 is a block diagram showing an ATM cell carrying an RM cell in the payload. The RM cell is located in octets 1–48 of the payload, and is comprised of the following fields: protocol ID (ID), data flow direction (DIR), backward explicit rate congestion notification (BN), congestion indication (CI), no increase (NI), explicit rate (ER), current cell rate (CCR), minimum cell rate (MCR), and cyclic redundancy check for the RM cell (CRC-10).

The ER field comprises congestion information. Each switch reviews the ER field of the RM cell, and alters it if certain criteria are met. The RM cell returns to the sender, which adjusts its output rate based on the RM cell. In this way, the sender output rate is adjusted to account for congestion in the network as reflected in the ER field of the RM cell.

ABR Session

Generally, an ABR session begins by the sender making an ABR call setup request. Call setup establishes parameters for the ABR session, some of which control the rate at which the sender transmits data. The rate at which an ABR sender is allowed to send cells for transmission is the allowed cell rate (ACR). ACR is initially set by the sender to an initial cell rate (ICR). ACR is always maintained between the minimum cell rate (MCR) (FIG. 3, octets 12 and 13) and the peak cell rate (PCR). The sender places ACR in the current cell rate (CCR) field (FIG. 3, octets 10 and 11) of the RM cell, and the rate at which it wishes to transmit cells, usually the PCR, in the explicit rate (ER) field (FIG. 3, octets 8 and 9).

After call setup, the sender begins transmitting data, and also sends out an initial RM cell. The RM cell is transmitted to the destination (or a virtual destination), and is returned to the sender. During its travel, the RM cell may be modified by switches in the network or by the destination. If any switch encountered along the way or the destination cannot support the rate indicated by the ER field, the value of the ER field is lowered to the level the switch or destination can support. When an RM cell reaches the destination, the destination turns the cell around for transfer back to the sender. The sender then adjusts its output transmission rate based on the ER field of the returned RM cell.

The general rule is that a switch should not increase the specified ER since information from switches previously encountered by the RM cell would then be lost. Forward RM cells can be modified by any switch on the forward path. Backward RM cells are generated on backward path and modified by switches on the backward path. ER is only modified for connections that are a bottleneck if the explicit rate of the switch is less than that carried in the ER field. Also, modification of the ER field only occurs on either their forward or backward journeys, but not on both.

In addition to RM cells generated by the sender, the destination and switches in the return transmission path may optionally generate a controlled number of RM cells. Each RM cell continues to travel through the network, ultimately returning to the sender. The sender, therefore, is constantly updating its output rate based on the incoming RM cells.

In summary, a sender receives an RM cell and adjusts its ACR depending on the ER field of the RM cell. Thus, the network dynamically adjusts flow rates of the ongoing sessions in the network.

Some sessions, however, receive more available bandwidth than others. "Fairness" is the measure of how the available bandwidth is distributed. There are many different definitions of fairness, but in most of the cases fairness is defined as proportional or additive to the MCR.

Prior art fairness algorithms distribute ACR among contending ABR connections under the assumption that MCR is zero. These techniques, however, fail to address the nonzero MCR case. That is, even though the sender is allowed to advertise a nonzero MCR, the prior art has not been proven to actually converge to a proper result under realistic assumptions (e.g., changing network loads).

It is desirable, therefore, to provide a method and system for providing fairness among contending ABR sessions.

II. SUMMARY OF THE INVENTION

The present invention satisfies this and other desires by providing fairness among contending ABR sessions. More particularly, the present invention determines congestion feedback information based on per port congestion analysis to provide convergence and simplicity of implementation.

An apparatus consistent with the present invention, for use in a network with rate-based feedback congestion control, comprises a device for counting cells that pass through a particular port to determine a count; a device for receiving available capacity information associated with the cells; and a device for developing a congestion control parameter based on the count and available capacity information.

A method consistent with the present invention, for use in a network with rate-based feedback congestion control, comprises counting cells that pass through a particular port to determine a count; receiving available capacity information associated with the cells; and developing a congestion control parameter based on the count and available capacity information.

A network consistent with the present invention, for implementing rate-based feedback congestion control, comprises a device for counting cells that pass through a particular port to determine a count; a device for receiving available capacity information associated with the cells; a device for developing a congestion control parameter based on the count and available capacity information; a device for inserting the congestion control parameter into a cell; a device for transmitting the cell; a device for receiving the cell at a sender; and a device for adjusting the output rate of the sender based on the congestion control parameter.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed. The accompanying drawings, which are incorporated in and constitute a part of this specification, illustrate an embodiment of the invention, which, together with the description, serve to explain the principles of the invention.

III. BRIEF DESCRIPTION OF THE DRAWINGS

IV. DETAILED DESCRIPTION OF THE PREFERRED EMBODIMENTS

Reference will now be made in detail to a preferred embodiment consistent with the principles of the invention, an example of which is illustrated in the accompanying drawings. The same reference numbers may be used throughout the drawings to refer to the same or like parts.

Generally, apparatus and methods consistent with the present invention determine rate-based feedback information to provide fairness among contending ABR sessions. More particularly, the apparatus and methods consistent with the present invention provides fairness among ABR sessions by determining an optimum link control parameter (LCP) for insertion into the ER field of RM cells. As used herein, "link" and "port" are used interchangeably.

In a preferred embodiment, the LCP is based on per port ABR session activity. A sender receives RM cells having the LCP, and adjusts its output transmission rates based on the LCP value. Determining LCP in a way that reflects per port ABR activity provides an accurate measure of network congestion, and therefore serves to provide fairness among sessions contending for ABR service.

LCP is determined in accordance with the apparatus and method disclosed herein using per port ABR rate information and other network data flow information. The LCP is stuffed into the ER field of outgoing RM cells of a particular port. Determining rate flow on a per port basis results in a significant reduction in computation complexity as compared to tracking per-session rate information.

Switch Architecture and Operation

Figure 4:
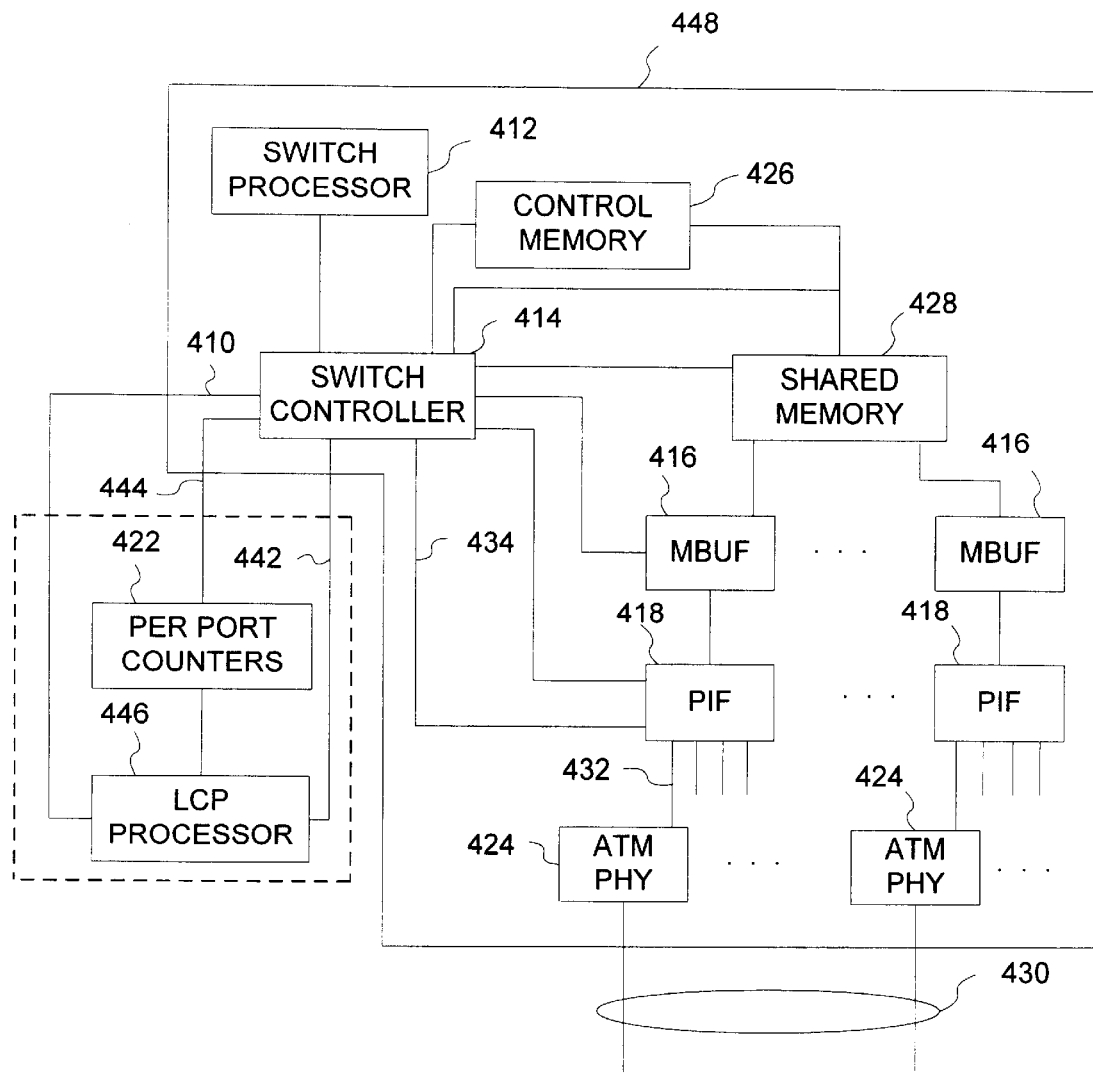
FIG. 4 is a block diagram showing a centralized system for determining a link control parameter consistent with the present invention.

FIG. 4 is a block diagram of a centralized embodiment for determining new LCP values. Switch 448 is similar to switch 114 of FIG. 1, but is altered to provide an optimized LCP based on per port ABR rate information consistent with the present invention. The area shown in broken line delineate the elements not found in prior art switches. The elements shown in the broken line area are the primary elements for determining new LCP values.

Figure 1:
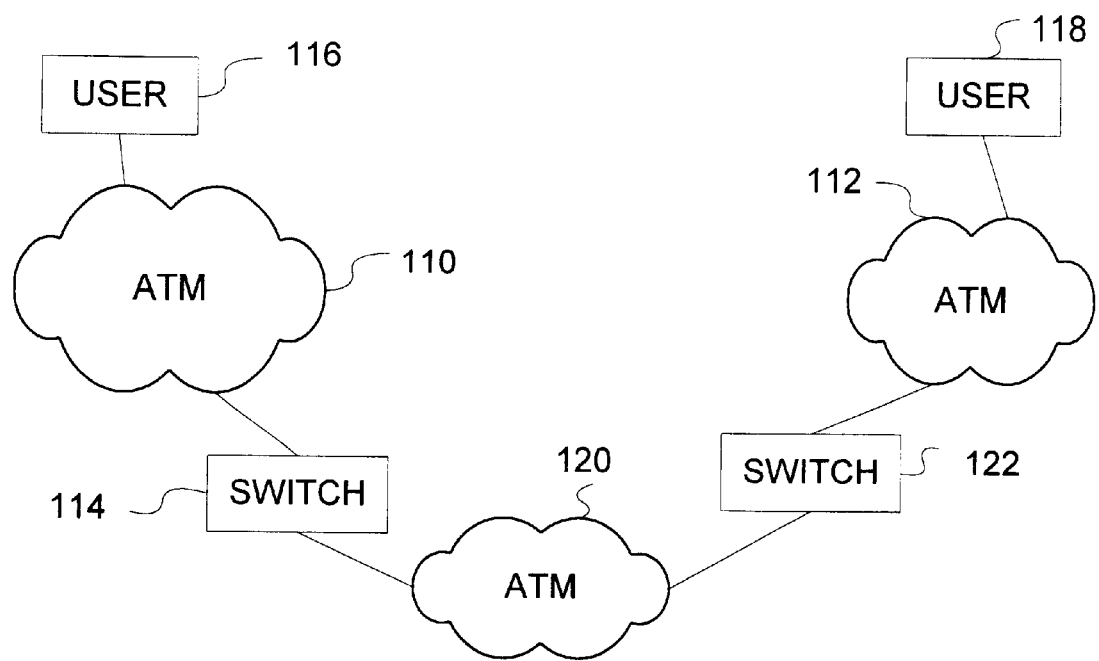
FIG. 1 is a block diagram showing a prior art network architecture.
Figure 2:
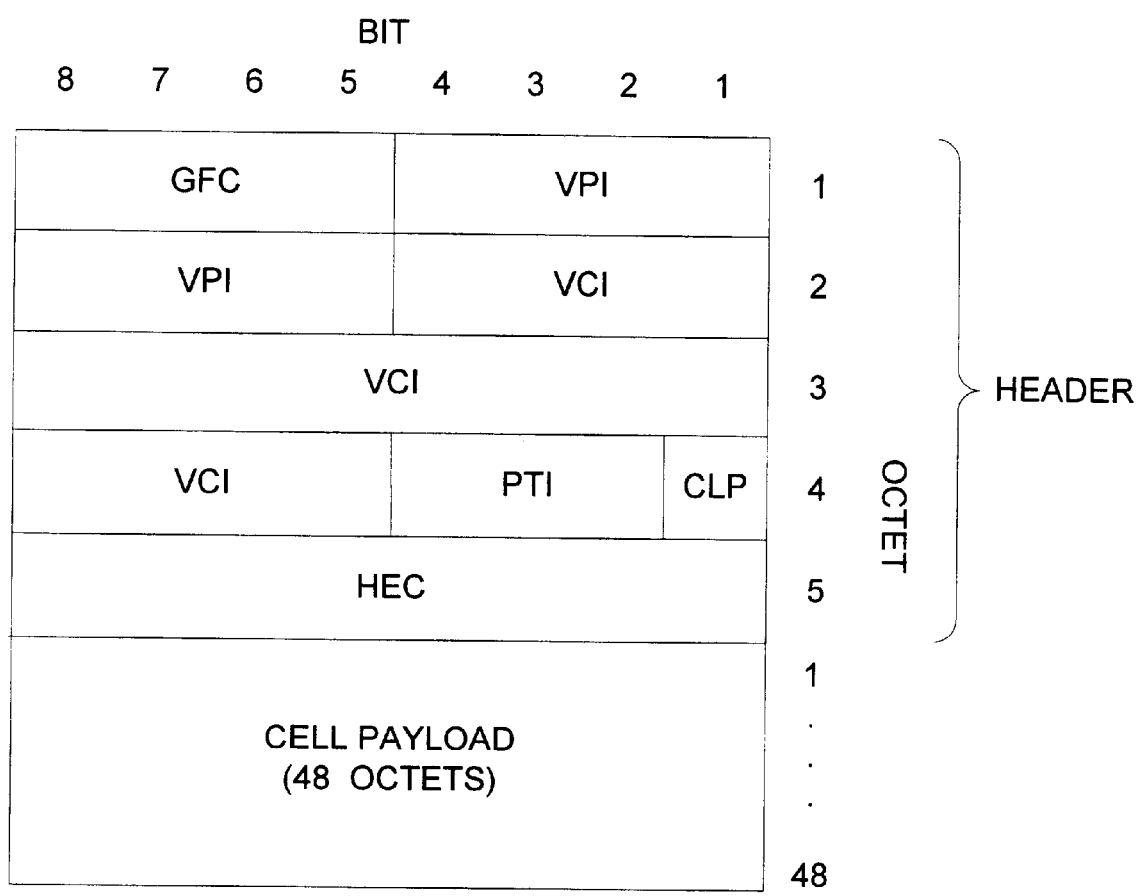
FIG. 2 is a block diagram showing the format of an ATM cell.
Figure 3:
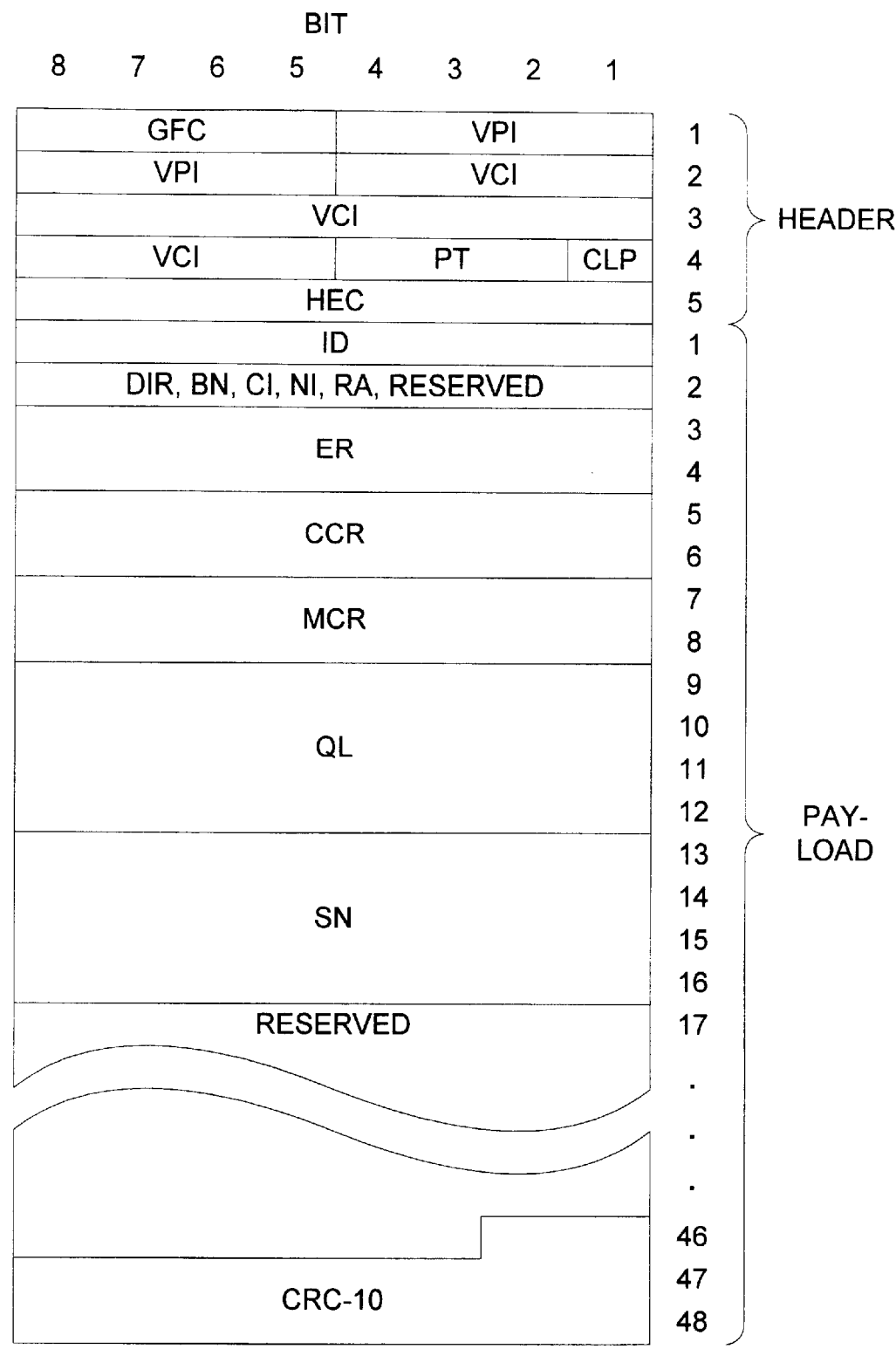
FIG. 3 is a block diagram showing an ATM cell carrying an RM cell in the payload.

ATM paths 430 connect switch 448 to ATM networks, such as ATM networks 110 and 120 of FIG. 1. Switch controller 414 controls and coordinates the operations of control memory 426, shared memory 428, plural memory buffers (MBUFs) 416, plural peripheral interfaces (PIFs) 418, and plural ATM physical interfaces (ATM PHYs) 424.

Switch processor 412 communicates with switch controller 414 to assist in coordinating and monitoring the operations of the switch. Switch controller 414 also has an extra features interface 410 over which information available in the switch may be transferred. For example, switch controller 414 may provide a variety of switch flow information over extra features interface 410.

Cells flowing into the switch over ATM paths 430 are processed by ATM PHYs 424, PIFs 418, and MBUFs 416 as is well-understood in the art. PIFs 418 parse the header from each incoming cell, and transmit it to switch controller 414 over path 434. PIFs 418 then forward the cell payload to MBUFs 416. Switch controller 414 analyzes the headers to determine destination information for each payload, and then causes each payload to be transferred from MBUFs 416 to the appropriate output queue in shared memory 428. Each output queue is associated with a particular switch output port.

The payloads are transferred from the output queues of shared memory 428 to MBUFs 416, and then to PIFs 418. The PIFs receive header information from switch controller 414 over path 434, and add the headers to the outgoing payloads. Finally, the cells are transmitted by PIFs 418, to ATM PHYs 424, for transmission over ATM paths 430.

LCP Determination

The methods and apparatus consistent with the present invention monitor ATM ABR rates on a per port basis. The per port ABR rate is used to determine an LCP parameter that may be stuffed into the ER field of RM cells leaving the switch.

Figure 5:
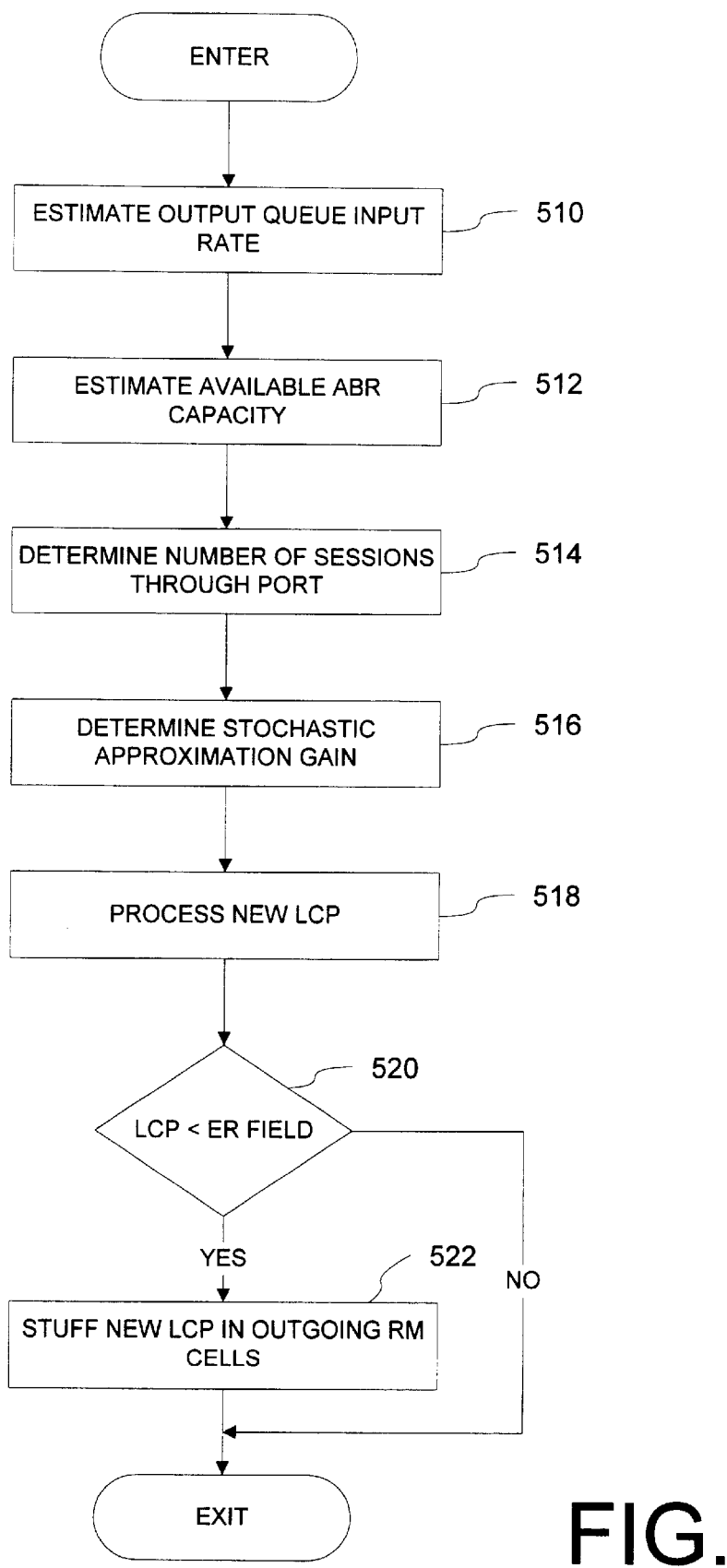
FIG. 5 is a flowchart illustrating a method of determining a new LCP value consistent with the principles of the present invention.

FIG. 5 is a flowchart illustrating a method for determining an LCP value consistent with the present invention. A new LCP value is periodically determined for each output port. First, information regarding network flow in the switch is collected, including the input rate to an output queue of shared memory 428 (step 510), available ABR capacity (step 512), the number of sessions flowing through the port corresponding to the output queue (step 514), and a stochastic approximation gain (step 516). Based on these values, an LCP value for the port is determined (step 518). When an RM cell arrives for transmission out of the port, the value in the ER field of the RM cell is compared with the LCP of the port. If the LCP value is smaller than the ER value in the RM cell, then the ER field of the RM cell is replaced with the LCP value of the port and the RM cell is scheduled for transmission out of the port (steps 520–522). If, on the other hand, the LCP value of the port is larger than or equal to the ER field of the RM cell, then the procedure is exited. This process is repeated for each arriving RM cell at each port of the switch.

The information for estimating the ABR input rate of the output queues in shared memory 428 (step 510), may be determined by several methods. Two embodiments, a centralized embodiment and distributed embodiment, are discussed herein.

Centralized Determination of ABR Per Port Rates

Returning to the centralized embodiment of FIG. 4, switch controller 414 receives cell headers from PIFs 418 to 438, and determines from the header whether the cell is an ABR cell. If the cell is an ABR cell, switch controller 414 reads the VPI and VCI fields from the header, and determines which switch output port the VPI/VCI pair is associated with. The port number is forwarded over path 444 to per port counters 422. Per port counters 422 count the number of incoming ABR cells that will be transferred out of the switch on a particular port.

Switch controller also determines queue fill information for the output queues in shared memory 428, and the number of sessions per output port during a specified time period. Monitoring of these values is well-understood in the art. LCP processor 446 accesses this information over extra features interface 410. Using, for example, the per port ABR counts from per port counters 422, the queue fill information, and the number of session per output port, LCP processor 446 determines a new LCP for each port. Based on current value of LCP in the ER field, LCP processor 446 determines whether the new LCP should be used, or whether the old LCP value should continue to be used in outgoing RM cells of a particular port. Every forward RM cell is passed from the shared memory 428 to the LCP processor 446 by the switch controller 414. If the new LCP is to be used, LCP processor 446 computes and stuffs the LCP in the ER field and passes it back to the shared memory 428 via switch controller 414.

Per Port Counters 422

Figure 6:
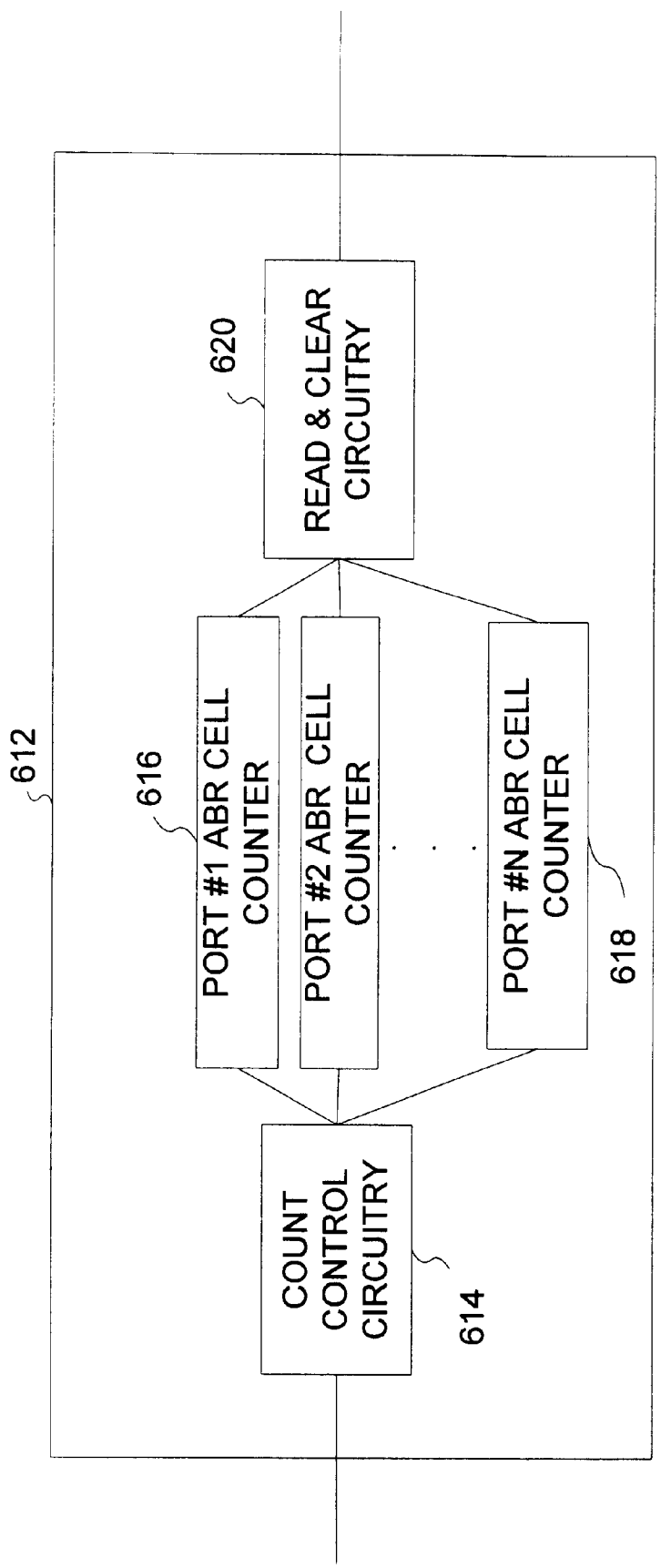
FIG. 6 is a block diagram showing an apparatus for counting per port ABR session information consistent with the present invention.

FIG. 6 is a block diagram showing a per port counter 612, consistent with the present invention, such as a per port counter 422 of FIG. 4. Count control circuitry 614 receives the port numbers from switch controller 414 (as described above), and sends a pulse signal to the counter (616–618) corresponding to the identified output port. Therefore, each counter has an accurate count of ABR cells exiting the switch on a particular output port. In a preferred embodiment, there is one counter for each output port.

Periodically, LCP processor 446 requests port count information from read and clear circuitry 620. In response, read and clear circuitry 620 reads the ABR cell count for a particular output port, and forwards the count to LCP processor 446. The count may then cleared by read and clear circuitry 620.

Distributed Determination of ABR Per Port Rates

Figure 7:
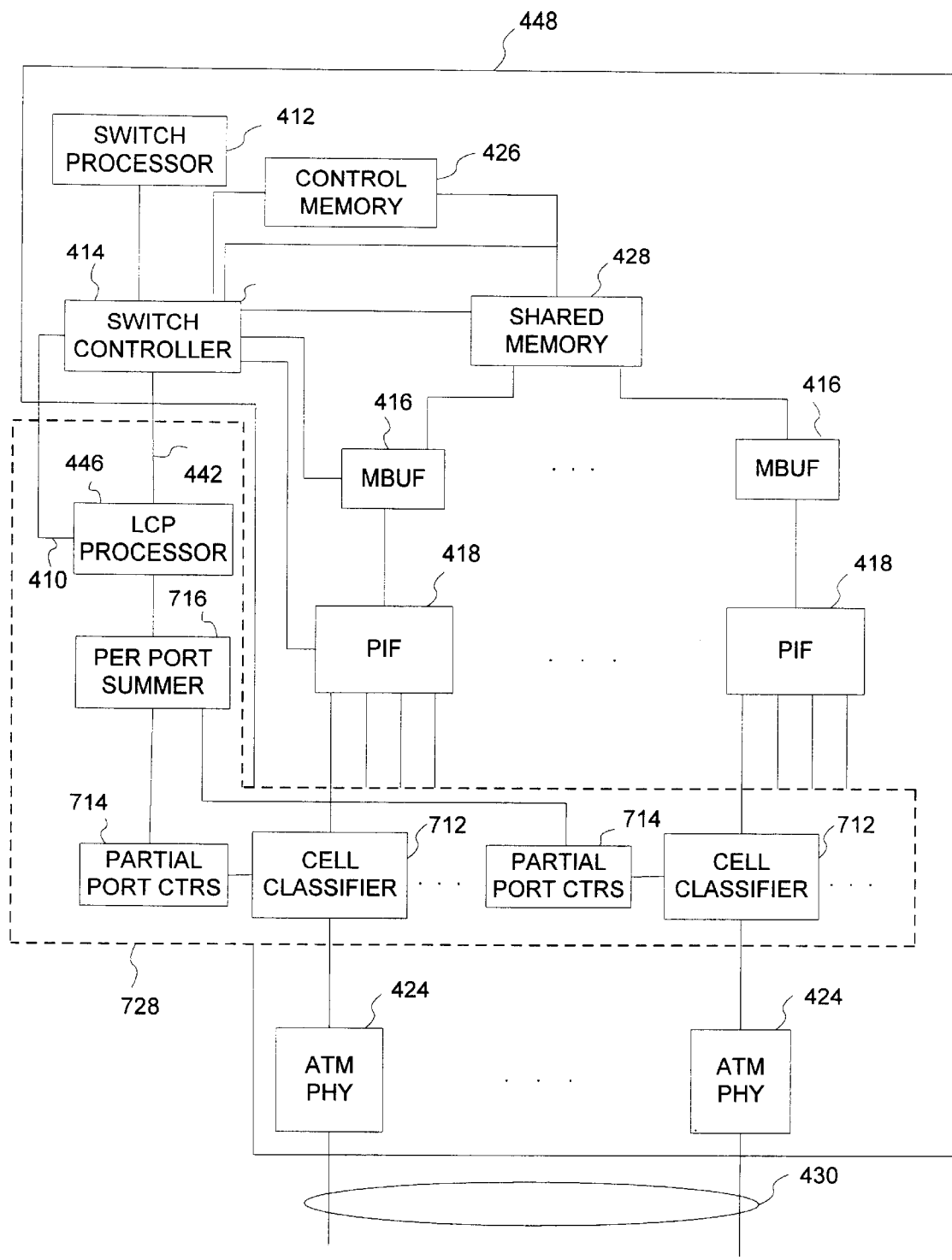
FIG. 7 is a block diagram showing an apparatus for implementing distributed per port ABR flow measurement consistent with the present invention.

FIG. 7 shows a block diagram of a distributed embodiment of an apparatus for collecting per port ABR rate information consistent with the present invention. Several elements are the same as shown and described with respect to FIG. 4. In FIG. 7, block 728, indicated by broken line, includes several cell classifiers 712 interposed between ATM PHYs 424, and PIFs 418. These elements monitor incoming cells to determine which output ports the cell will use to exit switch 448. From this information, rate information of the switch output ports can be ascertained.

In the distributed system of FIG. 7, each cell classifier has an associated partial port counter. Cell classifiers 712 are interposed between each of ATM PHYs 424 and PIFs 418, respectively. Each cell classifier analyzes headers of cells coming into the switch over ATM PHYs 424 to determine whether the cell is an ABR cell. If the cell is an ABR cell, the cell classifier determines the output port over which the cell will be transmitted. This port information is transferred to the partial port counter 714 connected to the cell classifier.

Partial port counters 714 operate in a manner similar to per port counters 422 of FIG. 4 (see FIG. 6). In the distributed embodiment, however, each of partial port counters 714 only maintain partial counts of cells coming in over a single port that will leave the switch on a particular port. For example, partial port counters 714 has a counter corresponding to each. outgoing port, but only counts cells that came in on the particular port associated with partial port counter 714. Therefore, to obtain a complete count of all cells destined for an output port, the counter associated with a particular output port in each of partial port counters 714 must be added together.

Per port summer 716 adds together the partial cell counts from each of port counter of partial port counters 714 corresponding to a particular output port. This provides accurate counts for all ABR cells that arrive at the switch destined for a particular port. Per port summer 716 forwards the count corresponding to each output port in response to LCP processor 746. LCP processor 746 uses the per port counts for determining a new LCP for each output port.

LCP processor 746 also receives switch flow information, such as queue fill information and sessions per output port information, from switch controller 414, as discussed with respect to FIG. 4. Consistent with the present invention, LCP processor 746 uses the queue fill information, the number of sessions per output port, and the per port cell count information to determine a new LCP for each port.

Stuffing can be done as in the centralized embodiment. Alternatively, cells can be stuffed at the egress determining a new LCP ensures that each sender receives its fair share of bandwidth automatically. Because all the switches implement the determination of LCP, a network wide fair allocation is achieved automatically.

Cell Classifier

Figure 8:
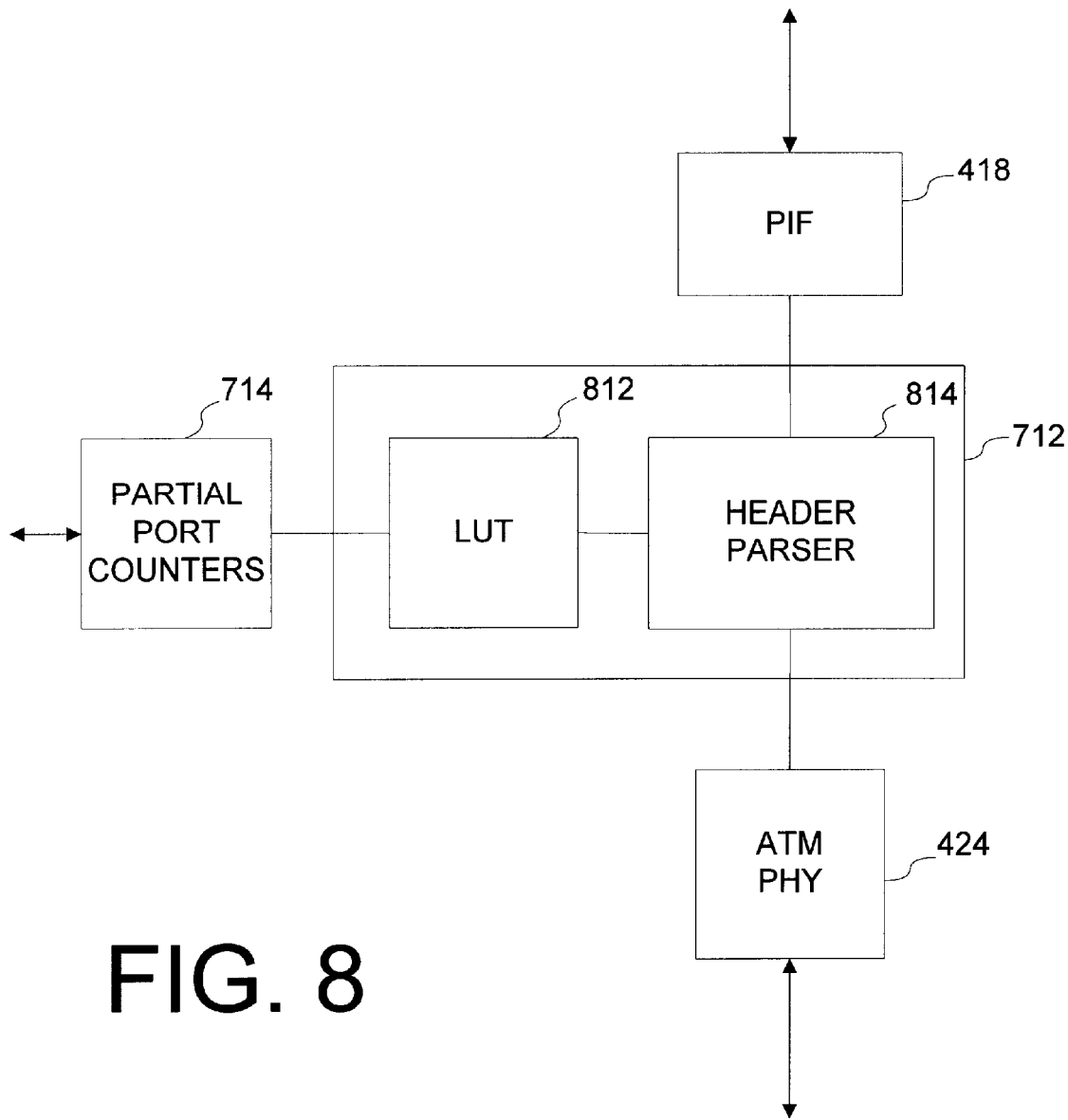
FIG. 8 is a block diagram of cell classifier 712 of FIG. 7.

FIG. 8 is a block diagram of one of the cell classifiers, such as cell classifier 712 of FIG. 7. Cell classifier 712 is comprised of header parser 814 and lookup table (LUT) 812. Header parser 814 receives cells from ATM PHY 424, and determines if the cell is an ABR cell. If the cell is an ABR cell, header parser 814 reads the VPI and VCI fields and forwards them to LUT 812. The VPI/VCI pair act as an address to a port number stored in LUT 812. The port number is read out of LUT 812, and forwarded to partial port counters 714. Partial port counters 714 increment the counter corresponding to the port number. The cell is forwarded by header parser 814 to PIF 418.

Determining LCP: Overview

Rate adjustments are carried out by the sender in response to the LCP values stored in the ER field of RM cells. In accordance with the principles of the present invention, to ensure an "almost sure" convergence, the determination of the new LCP value uses a decreasing update gain parameter called the stochastic update gain ($\alpha_l$). This parameter is determined from the information provided on per-port utilization by connection admission control (CAC), which is a set of actions taken by the network to determine whether a connection request should be accepted or rejected. Queue threshold up-crossing and down-crossing levels may also be used to determine the decreasing update gain parameter.

$\alpha_l$ in a preferred embodiment is a stored list of numbers. Whenever any event occurs (e.g. CAC or queue level crossing over) alpha is reset to the top most element in the list.

The value of $\alpha$ starts with $\alpha_l^0 < 1$. Then at each iteration, it is reduced by some amount. Therefore, x is constantly being updated at each iteration. An update table in the LCP processor has N different values of x from $x_l^0 \ldots x_l^n$. At $x_l^n$ the value holds until it is reset.

Figure 9:
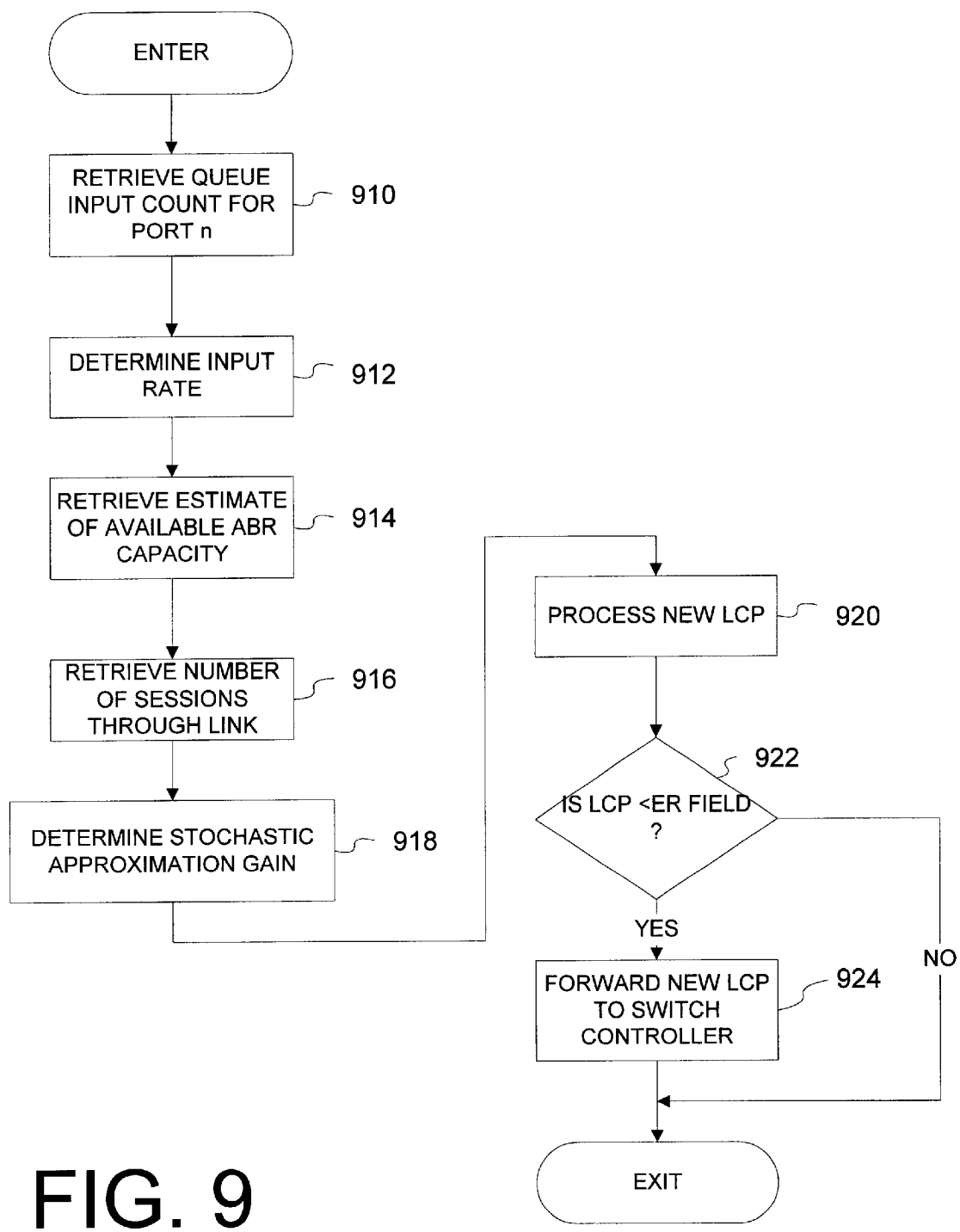
FIG. 9 is a flowchart showing the processing performed by LCP processor 446.

FIG. 9 is a flowchart showing the processing performed by LCP processor 446 consistent with the present invention. LCP processor 446 first retrieves the input ABR cell count accumulated for output port n (step 910). By dividing the count by the elapsed time since the count started, the input rate is determined (step 912). The estimate of available capacity is then obtained from switch controller 414 (step 914), as well as the number of sessions through the link (step 916). The available capacity is the capacity on a link left over after CBR and VBR sessions. A stochastic approximation gain is then determined (step 918). The new LCP is then determined from the collected information (step 920). If the new LCP is to be used, the value is forwarded to stuffing circuitry 414 for insertion into the ER field of outgoing RM cells on the port associated with the new LCP value. If the new LCP value is not to be used, the procedure is exited. This process is continued repeatedly for each outgoing port.

Determining LCP: Detailed Discussion

As discussed above, LCP is periodically updated (e.g., every 10 ms) for each outgoing link. Determination of LCP will now be described in detail. The following variables are used:

$\eta$ = link control parameter (LCP)

$\alpha_l^0$ = initial estimate of the stochastic approximation gain $f_l$ = estimate of the input rate of the ABR flow $C_l$ = estimate of the available capacity (i.e., capacity left over after CBR and VBR sources have been served)

$\alpha_l$ = stochastic approximation gain used for the update $C_l^{max}$ = maximum permissible value for $\eta$ $n_l$ = number of sessions through the link The input rate $f_l$ is first determined according to the following equation:

$$f_l = \frac{\text{number of ABR cells that arriving the previous inter-update interval}}{\text{length of inter-update interval}} \qquad \text{Eqn. (1)}$$

The available capacity $C_l$ is then determined. In a preferred embodiment, $C_l$ is determined as follows:

$$C_l = \frac{\text{number of ABR cells that arriving the previous inter-update interval}}{\text{length of busy period of ABR output queue}} \qquad \text{Eqn. (2)}$$

As iterations proceed, the stochastic approximation gain $\alpha_l$ becomes smaller so that there is convergence. Periodically, however, the stochastic approximation gain is reset to its initial large value as shown in Eqn. 3 if the mean of the available ABR capacity has changed, if the queue length is greater than the preset queue threshold, or if low link utilization has been detected. These conditions are monitored by switch controller 414, and transmitted to LCP processor 446.

$$\alpha_{l \leftarrow \alpha_l}^0 \qquad \text{Eqn. (3)}$$

The new value of the link control parameter $\eta$ is then determined as follows:

$$\eta_l \leftarrow \left[\eta_l + \alpha_l\left(\frac{C_l - f_l}{n_l}\right)\right]_0^{C_l^{max}} \quad \text{Eqn. (4)}$$

where $[x]_a^b = \max(a, \min(x,b))$.

As the value of $\alpha_l$ gets smaller, the response gradually diminishes even with large changes in the available capacity $C_l$. Since large changes in the available capacity are generally due to the entry or exit of CBR and VBR sessions, however, these large changes will be available to the switch based on information from CAC. In a preferred embodiment, this change in information is used to reset the gain $\alpha_l$ to its initial large value. Systems and methods consistent with the present invention thus adapt quickly to link capacity.

Figure 10:
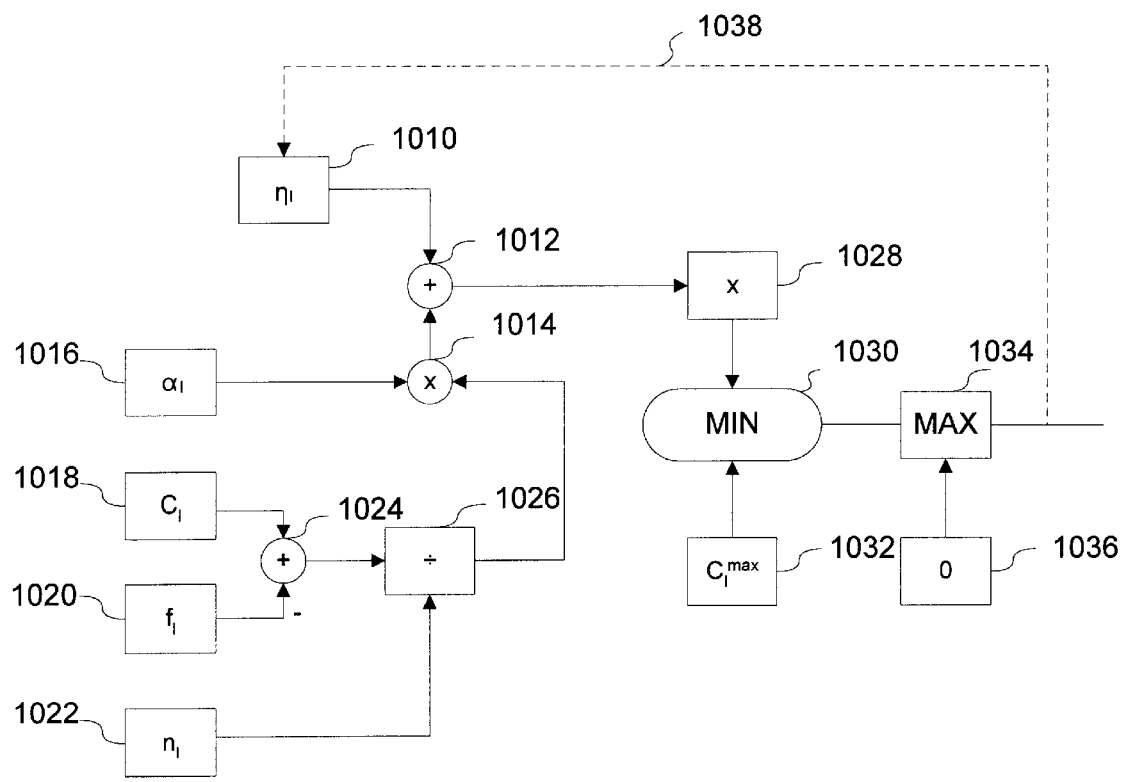
FIG. 10 is a block diagram showing a preferred embodiment of the elements which perform Eqn. 4.

FIG. 10 is a block diagram showing a preferred embodiment of the elements which perform Eqn. 4. The estimate of the input rate of the ABR flow into ABR output port queue 1020 is subtracted from the estimate of available capacity after CBR and VBR are serviced 1018 (adder 1024). This number is divided by the number of sessions through the particular link 1022 (divider 1026). The result of the division is then multiplied by the initial estimate of the stochastic approximation gain 1016 (multiplier 1014). The current link control parameter is then added to this result (adder 1012). This value becomes the valuex(1028), which is then applied to the min 1030 and max 1034 functions with respect to the maximum possible value for the link control parameter ($C_l^{max}$)(1032) and 0 (1036). The result of the function becomes the new link control parameter.

Determination of Link Capacity $C_l$

Because the max-min fair session rate is based on available capacity across multiple ports, it is a global solution for a given network topology, session configuration and link capacities. Therefore, a change in link capacity in one of the links affects the rates of other sessions, even though these other sessions do not use the link in which the capacity has changed. This change is evidenced by switch queue fill levels either increasing or decreasing. In a preferred embodiment, a queue threshold is used as an indicator of input-output rate mismatch at a switch occurring due to such a case. The gain is reset to its initial value when the queue length crosses the preset queue threshold.

At each update, the present link utilization is determined as follows:

$$\rho = \frac{\text{total time that the queue had at least one customer}}{\text{update interval}} \quad \text{Eqn. (5)}$$

$\beta$ is a transformed link utilization parameter based on actual link utilization. If $\rho$ is greater than a predetermined utilization threshold, then $\beta$ is set equal to $\rho$. Otherwise, $\beta$ is set to $h\beta+(1-h)\rho$. The variable h is a number between 0 and 1 that is chosen depending on the sensitivity to low link utilization that is desired. If a higher sensitivity is desired, a lower value of h is chosen. For example, if h=1 then $\beta_{new}=\beta_{old}$ (from previous update interval) so the measure of $\beta$ is not changed from the last time. If h=0, then $\beta_{new}=\rho_{new}$ so the gain $\alpha$ is reset because $\rho_{new}$<threshold). If, now $\beta$ is still less than the utilization threshold, the gain of the stochastic approximation algorithm is increased to its initial large value:

$$\alpha_l \leftarrow \alpha_l^0 \quad \text{Eqn. (6)}$$

In various preferred embodiments, available link capacity is estimated using three different methods. In the first method, described above with respect to Eqn. 5, a short term estimate of available link capacity is made. This is the simplest method of estimating the available link capacity. In each update interval, the number of ABR cells that have been served on a link are counted. The total time the ABR output queue for the link had at least one cell is also measured. An estimate of the available rate is then obtained by dividing the number of cells by the busy time of the queue. The rate so obtained is multiplied by a factor of 0.95 and used as $C_l$. The estimate of the available rate is obtained by dividing the number of ABR cells that arrived in the previous inter-update interval by the busy time of the queue.

In the second method, a long run estimate of available link capacity is made. In each update interval, the number of ABR cells that have been served on a link are counted. The total time the ABR output queue for the link had at least one cell is also measured. At each update, an average of estimates obtained over several previous update intervals is determined. The average is taken over all update intervals from the most recent mean capacity change epoch to the present update epoch. The average is then multiplied by a factor of 0.95 and used as $C_l$.

The third method estimates equivalent available link capacity. For each update interval, the number of ABR cells that have been served at a link is counted. The total time the ABR output queue for the link had at least one cell is also measured. The estimate of the available rate in the update interval is determined by dividing the number of cells by the busy time of the queue. If the present update is assumed to be the $N^{th}$ one from the most recent mean capacity change, and $X_i$, for i=1, . . . , N denotes the measurements in these N intervals, then the equivalent capacity is computed as follows:

$$C_l = -\frac{1}{\delta T}\log_e\left(\frac{1}{N}\sum_{i=1}^{N}\exp(-\delta X_i T)\right) \quad \text{Eqn. (7)}$$

A recursive formula which minimizes computational overhead can be derived for the above computation. The value of $\delta$ is then determined as a function of the desired buffer size and loss probability. To keep the probability of the buffer size from exceeding some fixed number B, less than some $\epsilon$, then a parameter $\delta$ is determined as follows:

$$\delta = -\frac{\log_e(\epsilon)}{B} \quad \text{Eqn. (8)}$$

The discrete time equivalent of this is, $$C_l = -\frac{1}{-\delta M}\log_e\left(\frac{1}{N}\sum_{j=1}^{N}\exp\left(-\delta\sum_{M=0}^{M-1}D_M^j\right)\right) \quad \text{Eqn. (9)}$$

where there are m slots in an update interval and we again look at N previous update intervals and $D_m^l$=number of ABR cells that can be served in the $m^{th}$ slot of the $j^{th}$ update interval.

A simple recursive estimation procedure can now be deduced from this formulation. Non-overlapping blocks of the service rate process are considered. C(N) is the estimated equivalent capacity until the $N^{th}$ block. D(N+1) is the average rate in the N+1$^{th}$ block. Let C(N+1) can be Written as $$C(N+1) = C(N) - \frac{1}{\delta M}\log_e\left(1 - \frac{1}{N+1}\right) - \frac{1}{\delta M}\log_e\left(1 + \frac{1}{N}\exp\{-\delta M(D(N+1) - C(N))\}\right)$$ Eqn. (10)

The terms containing log and exp can be replaced by suitable approximates for a large range of values.

Hardware Embodiment

Figure 11:
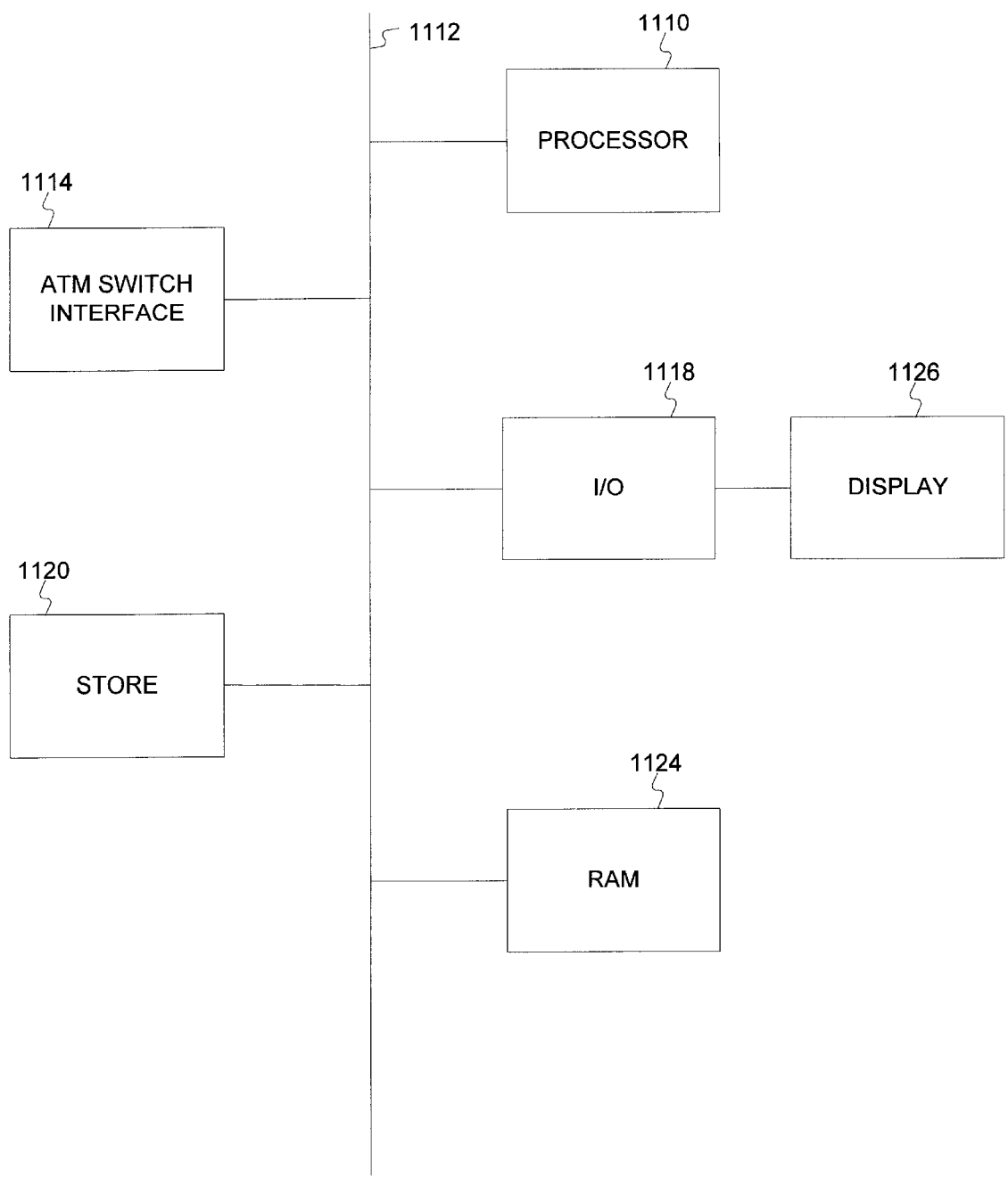
FIG. 11 shows a computer system which may be used to implement switch 114.

FIG. 11 shows a computer system which may be used to implement the switch 448 of FIG. 4 and FIG. 7 consistent with the principles of the present invention. Switch 448 is driven by a processor 1110, which is connected to several storage and interfacing devices via a bus 1112. Storage devices include a mass store 1120, a RAM 1124, and memory in processor 1110 (not shown). These storage devices:store some or all of the programs and data necessary for carrying out the functions of the preferred embodiments of the invention.

Switch 448 also includes at least one ATM interface, such as ATM switch interface 1114. ATM switch interface 1114 corresponds to the ATM physical interfaces of FIG. 4 and FIG. 7. ATM switch interface 1114 includes hardware and software necessary to carry out interfacing between switch 448 and the networks.

Input/output 1118 represents and may comprise one or more well-known communications adaptors (e.g., RS-232 or Ethernet) or user peripheral interfaces, and may connect to a display device 1126. Store 1120 in a preferred embodiment comprises flash memory, but may also be implemented using a RAID system, tape drive, disk drive or other storage device.

Methods and apparatus consistent with the invention described herein may be embodied in software executing on processor 1110. The executing software interacts with ATM network physical interface 1114 to collect per port ABR rate information to determine new LCPs as described above. The software may be embodied on any media usable by processor 1110, such as store 1120. The media may be a disk readable and usable by processor 1110. The media may also be a transmission medium, such as the Internet.

Apparatus and methods consistent with the present invention therefore provide fairness across ABR sessions by determining per port ABR rate information, and using that rate information to determine optimized LCP values. Consequently, the methods and apparatus consistent with the present invention provide fairness among contending ABR sessions.

V. CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

It will be apparent to those skilled in the art that various modifications and variations can be made in the apparatus and methods of the present invention and in its construction of this without departing from the scope or spirit of the invention.

Switch 448 as shown in FIG. 4 is for purposes of illustration only. Other configurations are possible without departing from the spirit and scope of the invention. The invention may be practiced in any manner that allows determining per port ABR session activity. Moreover, the principles of the methods and apparatus in accordance with the present invention can be used in a variety of ways. The principles can be extended to other types of networks, and other protocols. The principles of the methods and apparatus disclosed herein are not limited to ATM networks, but can be expanded to be used on any system having sender-controlled transmission rates.

We claim:

1. A method, for use in a network with rate-based feedback congestion control, comprising:

counting data that pass through a particular port to determine a count;

determining an available capacity at the port;

scaling a difference between the count and the available capacity using a stochastic approximation gain; and determining a congestion control parameter for the port based on the scaled difference.

2. A method, for use in a network with rate-based feedback congestion control, comprising:

counting cells that pass through a particular port to determine a count;

receiving available capacity information associated with the cells; and developing a congestion control parameter based on the count and available capacity information, wherein the step of developing a congestion control parameter includes utilizing a stochastic rate gain.

3. A method, for use in a network with rate-based feedback congestion control, comprising:

parsing headers;

forwarding the headers to a central location;

analyzing the headers at the central location to determine a port identification associated with each header;

developing port rate information for each port based on the port identification;

scaling a difference between an available capacity at each port and a count of packets passing through each port; and determining a congestion control parameter for each port based on the port rate information and the scaled difference.

4. The method according to claim 3, wherein the step of developing port rate information includes the substep of:

counting available bit rate service cells associated with each port.

5. The method according to claim 3, wherein the step of determining a congestion control parameter includes the substep of:

utilizing a stochastic rate gain.

6. The method according to claim 3, further comprising the step of:

inserting the congestion control parameter into a resource management cell.

7. A method for use in network congestion control, comprising:

parsing a first header to determine a respective port associated with the first header;

developing first partial port rate information based on the port associated with the first header;

parsing a second header to determine a respective port associated with the second header;

developing second partial port rate information based on the port associated with the second header;

combining the first partial port rate information and second partial port rate information to form a total port rate information;

scaling a difference between an available capacity at the port associated with the first and second headers and a count of packets passing through the port associated with the first and second headers; and developing a congestion control parameter based on the total port rate information and the scaled difference.

8. A method for use in network congestion control, comprising:

parsing a first header to determine a respective port associated with the first header;

developing first partial port rate information based on the port associated with the first header;

parsing a second header to determine a respective port associated with the second header;

developing second partial port rate information based on the port associated with the second header;

combining the first partial port rate information and second partial port rate information to form a total port rate information; and developing a congestion control parameter based on the total port rate information by utilizing a stochastic rate gain.

9. The method according to claim 7, further comprising the step of:

inserting the congestion control parameter into a resource management cell.

10. A method, for use in a network with rate-based feedback congestion control, comprising:

counting data that pass through a particular port to determine a count;

determining an available capacity at the port;

scaling a difference between the count and the available capacity using a stochastic approximation gain;

determining a congestion control parameter for the port based on the scaled difference;

inserting the congestion control parameter into a cell;

transmitting the cell;

receiving the cell at a sender; and adjusting the output rate of the sender based on the congestion control parameter.

11. The method according to claim 10, wherein counting the data includes counting available bit rate service cells.

12. A method, for use in a network with rate-based feedback congestion control, comprising:

counting cells that pass through a particular port to determine a count;

receiving available capacity information associated with the cells;

developing a congestion control parameter based on the count and available capacity information;

inserting the congestion control parameter into a cell;

transmitting the cell;

receiving the cell at a sender; and adjusting the output rate of the sender based on the congestion control parameter;

wherein developing the congestion control parameter includes utilizing a stochastic rate gain.

13. Apparatus, for use in a network with rate-based feedback congestion control, comprising:

means for counting cells that pass through a particular port to determine a count;

means for determining an available capacity at the port; and means for developing a congestion control parameter for the port based on a scaled difference between the count and the available capacity at the port, wherein the scaled difference is determined using a stochastic approximation gain.

14. Apparatus, for use in a network with rate-based feedback congestion control, comprising:

means for counting cells that pass through a particular port to determine a count;

means for receiving available capacity information associated with the cells; and means for developing a congestion control parameter based on the count and available capacity information, wherein the means for developing a congestion control parameter comprises means for utilizing a stochastic rate gain.

15. Apparatus for use in network congestion control, comprising:

means for parsing a first header to determine a respective port associated with the first header;

means for developing first partial port rate information based on the port associated with the first header;

means for parsing a second header to determine a respective port associated with the second header;

means for developing second partial port rate information based on the port associated with the second header;

means for combining the first partial port rate information and second partial port rate information to form a total port rate information;

means for scaling a difference between an available capacity at the port associated with the first and second headers and a count of packets passing through the port associated with the first and second headers; and means for developing a congestion control parameter based on the total port rate information and the scaled difference.

16. The apparatus according to claim 15, wherein the means for developing partial port rate information comprises:

means for counting available bit rate service cells.

17. Apparatus for use in network congestion control, comprising:

means for parsing a first header to determine a respective port associated with the first header;

means for developing first partial port rate information based on the port associated with the first header;

means for parsing a second header to determine a respective port associated with the second header;

means for developing second partial port rate information based on the port associated with the second header;

means for combining the first partial port rate information and second partial port rate information to form a total port rate information; and means for developing a congestion control parameter based on the total port rate information, wherein the means for developing the congestion control parameter includes means for utilizing a stochastic rate gain.

18. The apparatus according to claim 17, further comprising:
   means for inserting the congestion control parameter into a resource management cell.

19. A system, for a network with rate-based feedback congestion control, comprising:
   means for counting data that pass through a particular port to determine a count;
   means for determining an available capacity at the port;
   means for scaling a difference between the count and the available capacity using a stochastic approximation gain;
   means for determining a congestion control parameter for the port based on the scaled difference;
   means for inserting the congestion control parameter into a cell;
   means for transmitting the cell;
   means for receiving the cell at a sender; and
   means for adjusting the output rate of the sender based on the congestion control parameter.

20. The system according to claim 19, wherein the means for counting data comprises:
   means for counting available bit rate service cells.

21. Media having embodied thereon program code executable for performing a method, for use in a network with rate-based feedback congestion control, the method comprising steps of:
   counting data that pass through a particular port to determine a count;
   determining an available capacity at the port;
   scaling a difference between the count and the available capacity using a stochastic approximation; and
   determining a congestion control parameter for the port based on the scaled difference.

22. The media according to claim 21, wherein the step of counting data includes:
   counting available bit rate service cells.

23. Media having embodied thereon program code executable for performing a method, for use in a network with rate-based feedback congestion control, the method comprising steps of:
   counting cells that pass through a particular port to determine a count;
   receiving available capacity information associated with the cells; and
   developing a congestion control parameter based on the count and available capacity information;
   wherein developing the congestion control parameter includes utilizing a stochastic rate gain.

24. Media having embodied thereon program code executable for performing a method, for use in a network with rate-based feedback congestion control, the method comprising steps of:
   parsing headers;
   forwarding the headers to a central location;
   analyzing the headers at the central location to determine a port identification associated with each header;
   developing port rate information for each port based on the port identification;
   scaling a difference between an available capacity at each port and a count of packets passing through each port; and
   determining a congestion control parameter for each port based on the port rate information and the scaled difference.

25. The media according to claim 24, wherein the step of developing port rate information includes the substep of:
   counting available bit rate service cells associated with each port.

26. The media according to claim 24, wherein the step of determining a congestion control parameter includes the substep of:
   utilizing a stochastic rate gain.

27. The media according to claim 24, further comprising the step of:
   inserting the congestion control parameter into a resource management cell.

28. Media having embodied thereon program code executable for performing a method, for use in network congestion control, the method comprising the steps:
   parsing a first header to determine a respective port associated with the first header;
   developing first partial port rate information based on the port associated with the first header;
   parsing a second header to determine a respective port associated with the second header;
   developing second partial port rate information based on the port associated with the second header;
   combining the first partial port rate information and second partial port rate information to form a total port rate information;
   scaling a difference between an available capacity at the port associated with the first and second headers and a count of packets passing through the port; and
   developing a congestion control parameter based on the total port rate information and the scaled difference.

29. The media according to claim 28, wherein the steps of developing partial port rate information each include the substep of:
   counting available bit rate service cells.

30. Media having embodied thereon program code executable for performing a method, for use in network congestion control, the method comprising the steps:
   parsing a first header to determine a respective port associated with the first header;
   developing first partial port rate information based on the port associated with the first header;
   parsing a second header to determine a respective port associated with the second header;
   developing second partial port rate information based on the port associated with the second header;
   combining the first partial port rate information and second partial port rate information to form a total port rate information; and
   developing a congestion control parameter based on the total port rate information by utilizing a stochastic rate gain.

31. The media according to claim 28, further comprising the step of:
   inserting the congestion control parameter into a resource management cell.

32. Apparatus for use in network congestion control, comprising:
   a first parser for parsing a first header to determine a respective port associated with the first header;
   a device for developing first partial port rate information based on the port associated with the first header;
   a second parser for parsing a second header to determine a respective port associated with the second header;

a device for developing a second partial port rate information based on the port associated with the second header;

a device for combining the first partial port rate information and second partial port rate information to form a total port rate information;

a device for scaling a difference between an available capacity at the port associated with the first and second headers and a count of packets passing through the port associated with the first and second headers; and a device for determining a congestion control parameter based on the total port rate information and the scaled difference.

33. A system, for a network with rate-based feedback congestion control, comprising:

a counter for counting cells that pass through a particular port to determine a count;

a receiver for receiving available capacity information associated with the port;

a parameter device for determining a congestion control parameter based on a scaled difference between the count and the available capacity information, wherein the scaled difference is determined using a stochastic approximation gain;

a stuffing device for stuffing the congestion control parameter into a cell;

a transmitter for transmitting the cell;

a receiver for receiving the cell at a sender; and an adjuster for adjusting an output rate of the sender based on the congestion control parameter.

34. The method of claim 1 further comprising modifying a rate management cell arriving at the port based on the congestion control parameter.

35. The method of claim 1 further comprising modifying a rate management cell associated with a session established through the port based on the congestion control parameter and independent of particular traffic associated with the session.

36. The method of claim 1 wherein determining the available capacity includes determining an affective service capacity for the port such that a desired steady state probability that a buffer in the port exceeds a predetermined level is achieved.

37. The method of claim 1 wherein scaling the difference includes resetting the stochastic approximation gain to an initial value when a change in the available capacity at the port is detected.

38. A method, comprising:

determining a count of data passing through a port in a network;

determining an available capacity at the port; and determining a congestion control parameter for the port based on the count and the available capacity such that congestion through the port is controlled independent of particular traffic associated with each session established through the port.

39. The method of claim 38, wherein determining the congestion control parameter includes scaling a difference between the count and the available capacity using a stochastic approximation gain.

40. The method of claim 38 further comprising modifying rate management cells for all sessions established through the port based on the same congestion control parameter for the port.

41. A system, for a network with rate-based feedback congestion control, comprising:

means for counting cells that pass through a particular port to determine a count;

means for receiving available capacity information associated with the cells;

means for developing a congestion control parameter based on the count and available capacity information;

means for inserting the congestion control parameter into a cell;

means for transmitting the cell;

means for receiving the cell at a sender; and means for adjusting the output rate of the sender based on the congestion control parameter;

wherein the means for developing the congestion control parameter comprises means for utilizing a stochastic rate gain.

* * * * *